(12) United States Patent
Segal

(10) Patent No.: US 9,754,070 B2
(45) Date of Patent: *Sep. 5, 2017

(54) PATH-BASED FLOORPLAN ANALYSIS

(71) Applicant: Synopsys, Inc., Mountain View, CA (US)

(72) Inventor: Russell B. Segal, Sunnyvale, CA (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/918,435

(22) Filed: Oct. 20, 2015

(65) Prior Publication Data

US 2016/0042115 A1    Feb. 11, 2016

Related U.S. Application Data

(63) Continuation of application No. 14/522,182, filed on Oct. 23, 2014, now Pat. No. 9,189,591.

(60) Provisional application No. 61/895,795, filed on Oct. 25, 2013.

(51) Int. Cl.
*G06F 17/50* (2006.01)

(52) U.S. Cl.
CPC ...... *G06F 17/5081* (2013.01); *G06F 2217/84* (2013.01)

(58) Field of Classification Search
CPC ............. G06F 17/5072; G06F 17/5068; G06F 17/5077; G06F 2217/84; G06F 17/5054; G06F 17/5081; G06F 2217/08; G06F 17/5031; G06F 2217/62; G06F 17/505; G06F 2217/06; G06F 17/5036; G06F 17/5045; G06F 2217/78
USPC .................................. 716/136–139, 100–104
See application file for complete search history.

(56) References Cited

U.S. PATENT DOCUMENTS

| | | | |
|---|---|---|---|
| 9,189,591 B2* | 11/2015 | Segal | G06F 17/5081 |
| 2005/0268258 A1 | 12/2005 | Decker | |
| 2007/0150846 A1* | 6/2007 | Furnish | G06F 17/5068 |
| | | | 716/122 |
| 2008/0216038 A1* | 9/2008 | Bose | G06F 17/5072 |
| | | | 716/118 |
| 2011/0239179 A1* | 9/2011 | Shibatani | G06F 17/5031 |
| | | | 716/122 |

* cited by examiner

*Primary Examiner* — Binh Tat
(74) *Attorney, Agent, or Firm* — Park, Vaughan, Fleming & Dowler LLP; Laxman Sahasrabuddhe

(57) ABSTRACT

Systems and techniques for computing a timing effort metric are described. According to one definition, the computed timing effort metric indicates a level of difficulty of fixing a timing violation associated with a timing path between two circuit objects in a circuit design layout.

17 Claims, 2 Drawing Sheets

PATH-BASED FLOORPLAN ANALYSIS

RELATED APPLICATION

This application is a continuation of U.S. application Ser. No. 14/522,182, by the same inventor, filed on 23 Oct. 2014, the contents of which are herein incorporated by reference in their entirety for all purposes. U.S. application Ser. No. 14/522,182 claims benefit of U.S. Provisional Application No. 61/895,795, by the same inventor, filed on 25 Oct. 2013, the contents of which are herein incorporated by reference in their entirety for all purposes.

BACKGROUND

Technical Field

This disclosure relates to electronic design automation (EDA). More specifically, this disclosure relates to path-based floorplan analysis.

Related Art

Advances in process technology and a practically unlimited appetite for consumer electronics have fueled a rapid increase in the size and complexity of integrated circuit (IC) designs. The performance of EDA tools is very important because it reduces the time to market for IC designs. Floorplanning is an important stage in an EDA design flow that involves arranging relatively large circuit blocks (e.g., macros, memories, groups of smaller logic cells, etc.) within the area allotted to the circuit design. After these circuit blocks have been arranged in the circuit design (i.e., the circuit blocks have been placed in their assigned locations in the circuit design), the logic within each circuit block can then be placed and optimized to meet circuit performance goals.

Unfortunately, due to the rapid increase in the size and complexity of IC designs, due to the stringent timing, area, and power budgets that are imposed on the IC designs, and due to the limited capabilities of conventional floorplanning tools, the floorplanning stage often takes a very long time to complete and/or produces poor quality results.

SUMMARY

Some embodiments described herein provide methods and systems for predicting problems that a given floorplan might cause before the full design flow has been run. Some embodiments can identify which circuit problems may have been caused by a sub-optimal floorplan.

Some embodiments can compute a timing effort metric that indicates a level of difficulty of fixing a timing violation associated with a timing path between two circuit objects in a circuit design layout. Specifically, the embodiments can compute a physical distance between the two circuit objects. Next, the embodiments can compute a timing distance of the timing path between the two circuit objects, wherein the timing distance is based on an intrinsic delay of the timing path between the two circuit objects. The embodiments can then compute the timing effort metric based on the physical distance and the timing distance. Some embodiments can place the circuit design layout by using the computed timing effort metric.

The physical distance can be the Cartesian distance between the two circuit objects, or the Manhattan distance between the two circuit objects, or any other suitable distance measure between the two circuit objects. The intrinsic delay of the timing path can be a sum of intrinsic delays of circuit elements along the timing path. The timing distance of the timing path can be equal to the intrinsic delay of the timing path multiplied by a scaling factor, wherein the scaling factor can be based on a physical distance in the circuit design layout that corresponds to a unit delay.

Some embodiments can determine an attribute of a graphical user interface (GUI) element based on the computed timing effort metric. Next, the embodiments can display the GUI element having the determined attribute. For example, the GUI element can be a line that connects the two circuit objects, and the attribute of the GUI element can be one of: a value that is displayed in proximity to the GUI element, a color of the GUI element, a thickness of the GUI element, or any other attribute that can be used to convey information to a user.

DETAILED DESCRIPTION

Figure 1:
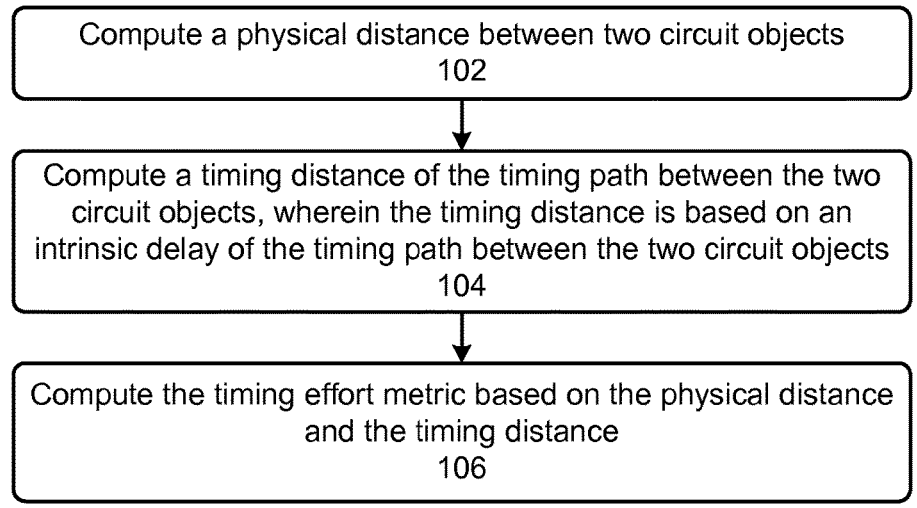
FIG. 1 illustrates a process for computing timing effort in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of an EDA Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are for illustrative purposes only and are not intended to limit the embodiments to the forms disclosed.

Some EDA software tools enable circuit designers to describe the functionality that the circuit designers want to implement. These tools also enable circuit designers to perform what-if planning to refine functionality, check costs, etc. During logic design and functional verification, the HDL (hardware description language), e.g., Verilog, code can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout and can be electrically coupled.

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Floorplanning Tools

A partition or block (the terms "partition" and "block" are used interchangeably in this disclosure) can represent a portion of the circuit design. In general, a circuit design can be partitioned into different blocks based on any criteria. For example, the circuit design may be partitioned into blocks based on functionality, e.g., one block may include computational circuitry (e.g., a processor) and another block may include memory circuitry (e.g., registers), etc. The EDA tool can allow users to select different levels of hierarchy to display as blocks, and the EDA tool can maintain an association between a block and a set of circuit objects (e.g., cells) that are in the block.

A floorplan typically refers to a schematic that provides at least the tentative sizes and tentative locations of the major partitions or blocks in an IC. A floorplanning tool can be used to create, edit, and view a floorplan for an IC. The GUI of a floorplanning tool can treat a block as a floorplan object that can be placed in the floorplan, and can be used to perform various operations (e.g., moving, resizing, reshaping, etc.) on the block.

Specifically, a floorplan can be constructed by first arranging blocks or partitions (which may be macros, memories, or just groups of smaller logic cells) within the area allotted to the circuit. After the blocks or partitions have been arranged, the smaller and more flexible logic ("flexible" in the sense that the EDA tool has more options for placing the logic) can be automatically arranged and optimized to meet circuit performance goals such as speed, power, and routablility. Decisions that a circuit designer makes while creating a floorplan can have a significant impact on subsequent EDA stages. Therefore, it is important to enable a circuit designer to quickly evaluate different floorplan options before deciding on the floorplan to use for a circuit design.

Unfortunately, conventional floorplanning tools provide relatively little insight to a circuit designer into the impact of a given floorplan on the final optimized circuit. This causes two problems: (1) while creating the floorplan, the designer may make mistakes which will not become evident until much later in the design flow, and (2) even when the design flow is completed, it may not be obvious whether or not some problems in the circuit were caused by an inferior floorplan.

Some embodiments described herein provide systems and techniques for predicting problems that a floorplan might cause before the full design flow has been run. Once the design flow has been run, some embodiments described herein can help determine which circuit problems may have been caused by a sub-optimal floorplan. Some embodiments described herein enable a circuit designer to adapt the floorplan to improve the circuit.

Path-Based Floorplan Analysis

Some embodiments described herein analyze a floorplan to isolate timing paths that cross between logic elements (macros, memories, ports, and logic hierarchies). Each timing path is characterized to quantify how intrinsically difficult it will be to make the timing path "meet timing" and where such intrinsically difficult paths have been stretched over a long distance. According to one definition, a timing path "meets timing" if the timing path satisfies a set of timing constraints. An "intrinsically difficult" timing path can be a path that has many components and/or components that are slower than average. If a path has these characteristics, it will be difficult for a circuit optimizer to make the path fast so that the path meets timing.

Some embodiments described herein predict how difficult it will be to meet timing for a plurality of timing paths by calculating timing path effort values and then graphically showing the timing path effort values so that the user can instantly "eye up" where a floorplan can be improved. Some embodiments described herein improve the design process by eliminating many floorplanning problems that would otherwise go unnoticed in existing EDA floorplanning tools.

Some embodiments described herein analyze can a floorplan that the user has created by hand, or a floorplan that an automatic tool has constructed or is in the process of being constructed. Depending on the layout of the floorplan, some timing paths may be stretched over a long distance. In general, if you stretch a path over a long distance, it will go slower (i.e., signals along this path will have longer delays) and it will make it harder for the path to meet timing. These embodiments can identify for the user where such intrinsically difficult paths have been stretched over a long distance. Some embodiments use a metric, called "timing path effort" (or "timing effort" for short), to quantify how intrinsically difficult it is for a timing path to meet one or more timing constraints. Paths with high timing path effort very often cause problems in the final circuit implementation. If the user rearranges at least some of the placeable objects in the floorplan to shorten the intrinsically difficult paths, he/she can significantly improve his/her chances that the floorplan will meet timing, thereby significantly reducing the amount of iterations and time required to create a circuit design that meets the desired performance goals. In other words, the process of identifying and fixing timing violations in the circuit design can be made less difficult by rearranging the floorplan so that the intrinsically difficult timing paths cover less physical distance.

Specifically, some embodiments described herein provide powerful features that can significantly reduce the design time and simultaneously improve the quality of results. As noted before, conventional floorplanning tools do not predict or analyze the effect that a floorplan has on the difficulty that a circuit designer will encounter while trying to meet timing. Having such an analysis can change the way circuit designers perform floorplanning. Specifically, during floorplanning, a user or a tool can consult the analysis (e.g., the timing path effort metric) in order to make more intelligent choices. Also, once the circuit design is complete, the user or the tool can consult the analysis again to look for problems that were overlooked previously. When the user is producing a floorplan, some embodiments described herein can generate and display flylines (a "flyline" can be defined as a line in the GUI that connects two objects in the layout) on top of the circuit layout, and the flylines can be used to show the timing path effort data. The flylines can be interactively updated so that the user can instantly "eye up" where a floorplan can be improved.

Traditionally, designing a circuit is done in discrete definition and optimization stages. Some embodiments described herein can be used in each stage of the circuit design to analyze the circuit design and to determine whether the circuit design is good enough to warrant moving to the next stage. Also, the analysis may enable a designer to determine whether or not he/she needs to double-back to an earlier stage of definition or optimization.

As mentioned before, some embodiments described herein use a metric called timing path effort (or timing effort for short). This metric indicates to the user the effect that the current floorplan has on the difficulty of meeting timing for timing paths in the circuit. If the timing effort is high for a particular timing path, then that indicates that it will be difficult or impossible to meet timing for the timing path when optimizing the layout for timing. The timing effort can be reduced by rearranging the floorplan to make the path cover less distance. Therefore, by looking at timing effort, the user can ask questions such as "which paths in my circuit are hard to implement in a way so that they meet timing?," "if I arrange my floorplan in a particular manner, am I stretching difficult paths and making them harder to implement?," and "in an optimized circuit, can some of the timing problems be explained by the presence of difficult paths that are stretched too far?"

Some techniques for determining the timing effort metric are now described. First, observe that two effects can make timing more difficult to meet in a timing path: (1) the slowness of circuit components along the path, i.e., if there are more slower components in the path, then it makes meeting timing more difficult, and (2) the distance in the layout that the path must cover, i.e., if the path has to cover a larger distance, then it makes meeting timing more difficult. In some embodiments, the timing effort computation combines these two effects to indicate how difficult it will be to ensure that a timing path will be able to meet timing.

In some embodiments, the timing effort can be calculated as follows. Given the circuit components for a timing path, compute a maximum distance where it should be possible for the timing path to meet timing. Let us call this maximum distance the "timing distance". Next, compute the distance that the timing path must cover in the layout for the current floorplan. Let us call this distance the "physical distance." If the physical distance is less than the timing distance, then the timing effort is low, i.e., the timing path is likely to meet timing in the current floorplan. On the other hand, if the physical distance is greater than the timing distance, then the timing effort is high, i.e., the timing path is unlikely to meet timing in the current floorplan.

The timing distance can be computed as follows. First, the "intrinsic delay" of each circuit component along the timing path can be determined. Specifically, intrinsic delay can be determined by timing a circuit component without the effect of any of its surrounding components. In one embodiment, determining the intrinsic delay of a component involves looking up the delay for the component while assuming that capacitive load that the component is driving is at or near zero, and its input transition time is at or near zero. According to one definition, the intrinsic delay of a component is the minimum amount of delay from an input of the component to the output of the component, i.e., all signals that pass through this component will experience a delay that is greater than or equal to the intrinsic delay.

As an example, consider the situation when a non-linear delay model (NLDM) is available to model the delay of circuit elements. The NLDM can be viewed as a two dimensional table, wherein one dimension can be the input slew, and the other dimension can be the output load. The NLDM may be implemented as a table, wherein the delay for a circuit element can be computed by performing a table lookup on the NLDM table based on the input slew and the output load, and the output of the table lookup operation can be the output slew and the output delay. In this example, the intrinsic delay for a given component can be the least delay value (or any other suitably low delay value, e.g., the 10 percentile delay value) that is stored in the NLDM table that models the delay of that component. Embodiments described herein can work with any type of delay model, and do not require that an NLDM delay model be available for the circuit element.

Next, the intrinsic delay of the timing path can be computed. In some embodiments, determining the intrinsic delay involves adding the delays of the components along the timing path. In other embodiments, the intrinsic delay can be computed by adding the delays of the components along the timing path while also accounting for timing exceptions. The intrinsic path slack can then be calculated. For example, the intrinsic delay can be subtracted from the allowable path delay. This process is similar to calculating a traditional path slack, except that we calculate intrinsic path slack by subtracting intrinsic path delay from the allowable path delay instead of subtracting the actual path delay from the allowable path delay. The allowable path delay represents the maximum amount of delay that the timing path is allowed to have. If the delay of the timing path is more than the allowable path delay then the timing path will fail to meet timing.

The timing distance can be computed by multiplying the intrinsic path slack by a scale factor. The value of the scale factor will depend on the silicon technology that is being used to manufacture the circuit design. A scale factor of 4000 microns/nanosecond can be used for some technology nodes that are currently being used in semiconductor manufacturing. According to one definition, the scale factor represents the amount of distance that a signal travels before incurring a unit delay. Multiplying the intrinsic path slack by the scale factor can be viewed as converting the intrinsic path slack from time units (e.g., nanoseconds) to length units (e.g., microns).

To compute the physical distance for the timing path, some embodiments measure the Manhattan distance between the two objects in the floorplan corresponding to the timing path (i.e., the distance from the object where the timing path begins to the object where the timing path ends). Specifically, some embodiments can measure the distance between the centers of the two objects. For example, if the center of object1 (i.e., the center of the object where the timing path begins) and the center of object2 (i.e., the center of the object where the timing path ends) are 2000 microns apart, we record the value 2000 as the physical distance. Other embodiments can use any other suitable technique for measuring distance between two points on the layout. For example, some embodiments can use the Cartesian distance. Another embodiment can use the distance between the closest edges of the two objects. Yet another embodiment can use the smallest Manhattan distance between a point on the first object and a point on the second object.

In the above examples, the physical distance corresponding to the timing path was computed as a distance between two objects, namely, a first object where the timing path begins, and a second object where the timing path ends. Alternatively, the physical distance can be computed by looking at all of the components in a timing path, and by adding up the individual distances between adjacent components in the timing path. In yet another embodiment, the process can look at the groups of logic in the circuit to determine distance. If the timing path starts at a particular component in one logic group (in this disclosure, the term "logic group" means "a group of logic elements in the circuit design," e.g., a block or partition that includes the component where the timing path starts), and the end of a path is a component in a different logic group (i.e., a block or partition that includes the component where the timing path ends), then the physical distance for the timing path can be set to be equal to the distance between these two logic groups. For example, the physical distance for the timing path can be set to be equal to the distance between the centers of the two logic groups, where the center can be the geometric center or can be the "center of mass" of the components that make up the logic group. Alternatively, the center of a logic group could be the center of a bounding box that encloses the logic group. As yet another example, the physical distance can be equal to the distance between the closest boundaries of the two logic groups. The above techniques for determining the physical distance associated with a timing path have been presented for illustration purposes only and are not intended to limit the scope of the embodiments described herein to the forms disclosed.

Finally, the timing effort can be determined based on the timing distance and the physical distance. For example, the timing effort can be determined by computing a ratio of the physical distance and the timing distance. For each timing path, some embodiments can determine the timing distance of the timing path and the physical distance covered by the timing path, and then the embodiments can compute the timing effort for the path by dividing the physical distance by the timing distance.

In these embodiments, if a particular timing path has a timing effort of 1.0, it will probably meet timing in the final implementation. If the timing effort is significantly greater than 1.0, then it will be very difficult or impossible to meet timing. A circuit designer or an automated tool can use the timing effort value to evaluate a floorplan. In order to reduce the timing effort, the circuit designer or the automated tool can move elements in the floorplan to make the path distances in the layout shorter.

Typically, the floorplan for an integrated circuit is generated with the aid of a floorplanning tool (which can be one of the tools in a suite of EDA tools). The GUI of the floorplanning tool shows the arrangement of big logic chunks such as macros and memories, and it shows the position of ports. The graphical representation displayed in the GUI can include a set of objects and a set of flylines between objects (e.g., a set of lines between two objects), wherein each object can correspond to a portion of the circuit design, and wherein each flyline can correspond to one or more relationships between the two objects associated with the flyline (e.g., a "relationship" between two objects can correspond to an electrical connection between the two objects or to a circuit path between the two objects that is capable of propagating logical signals).

Sometimes the GUI can show the position of groups of smaller circuit components. In some embodiments, the position of the groups can be shown with a square whose center is at the "center of mass" of the component cells. The area of the square is can be set to be equal to the sum of the areas of the grouped components. In this disclosure, the term "element" or "circuit object" (or "object" for short) can refer to a macro, a memory, a port, or in general any arbitrary group of components in the circuit design.

As mentioned above, a flyline is a line that is drawn between two elements in the GUI. A flyline is meant to show some relation between the two elements. For example, a flyline can be used to show that two elements are connected together in the circuit. One or more metrics associated with a flyline can be represented using one or more visual attributes associated with the flyline, such as a color attribute, a width attribute, or text. For example, a flyline can be drawn using a wider thickness to indicate that there are more connections between the two elements. Flylines can also be used to show timing effort. Specifically, a flyline might be drawn in red to indicate that there is high timing effort for a path between two elements. And one might choose to draw flylines in other colors to represent other timing efforts values. For example, a flyline might be green for a timing effort less than 0.8, it might be yellow for a timing effort near 1.0, it might be orange for an effort near 1.5, and it might be red for effort of 2.0 or more. In some embodiments, the colors in the visual spectrum can be used to represent a range of timing effort values, with the highest timing effort value corresponding to the red-end of the visual spectrum and the lowest timing effort value corresponding to the violet-end of the spectrum.

In these embodiments, the user can then interact with the GUI by moving elements connected by red or orange flylines closer together. Moving the elements closer together will reduce the timing effort on paths between the elements. Once elements have been moved, it is possible to almost instantaneously recalculate the timing effort between them (this is an important feature that is made possible because of the way in which timing effort is computed; further details of this important feature are explained below). It is also then possible to change the color of the flylines based on the updated timing effort values. For example, if objects are being moved closer together, the timing effort will drop, and the embodiments can change the color of a flyline from red to orange as the user is moving the objects closer together. Some embodiments thus enable a user to move objects around in the floorplan while receiving instantaneous feedback (e.g., via the flyline color) about the impact the movements are having on the timing of the circuit design. The user can continue to make such feedback-driven adjustments to the floorplan until, for example, the red and orange flylines are minimized, thereby creating a floorplan that is much more likely to result in a circuit design that will meet the desired performance goals.

As mentioned above, the timing effort can be updated very quickly. For example, consider the embodiments in which the timing effort is calculated by dividing the physical distance by the timing distance. When elements are moved in the floorplan, the timing distance does not change because the components in the timing path do not change (recall that the timing distance is based on the sum of intrinsic delays of the components in the timing path). Likewise, the physical distance can be computed very quickly. Therefore, the timing effort, which is computed based on the timing distance and the physical distance, can be calculated very quickly. Because the timing effort can be computed so quickly, the color of the flylines (or any other attribute of the flyline that is being used to indicate timing effort) can be adjusted "interactively," i.e., the user can immediately see the effect on the floorplan timing when the user moves objects in the floorplan.

The timing effort and timing distance computations can also be used in an automated design tool. For example, tools called placers can be used to automatically arrange elements in a circuit design to optimize the circuit performance. One of the performance goals that placers optimize is the speed of the circuit (this optimization is also known as "timing optimization"). The metrics typically used by a placer are "path delay" and "path slack". A placer can use the timing effort and/or the timing distance values described herein to evaluate a circuit and improve the circuit's timing. In one embodiment, the placer could limit the distance that a path covers so that it does not exceed the timing distance. In another embodiment, the placer could adjust the location of elements in the layout so that the timing effort of timing paths between the elements are minimized or are less than a given threshold.

In traditional timing analysis techniques, the path delay and the path slack changes when a floorplan changes. Specifically, whenever a floorplan is changed, the path delay and path slack values of the circuit become out-of-date and the placer has to spend an enormous amount of computational time to update the path delay and path slack values by propagating timing information throughout the circuit design. This is one of the reasons why existing floorplanning tools cannot interactively provide circuit timing feedback to the user as the user is modifying the floorplan. In contrast, the timing distance can be calculated for each timing path based on the intrinsic delays of the components in the timing path. Once the timing distance has been calculated, it does not change when the floorplan changes. In other words, as the placer optimizes a circuit design, the timing distance remains constant because it does not become out-of-date. This is one of the reasons why some embodiments described herein can interactively provide circuit timing feedback to the user as the user is modifying the floorplan.

FIG. 1 illustrates a process for computing timing effort in accordance with some embodiments described herein. As explained above, the timing effort metric can indicate a level of difficulty of fixing a timing violation associated with a timing path between two circuit objects in a circuit design layout. Specifically, an EDA tool can receive a circuit design layout, e.g., the EDA tool can open a file that contains the circuit design layout. Next, the EDA tool can compute a physical distance between the two circuit objects (operation 102). The physical distance can be the Cartesian distance between the two circuit objects, or the Manhattan distance between the two circuit objects, or any other physical distance metric described in this disclosure.

The EDA tool can then compute a timing distance of the timing path between the two circuit objects, wherein the timing distance is based on an intrinsic delay of the timing path between the two circuit objects (operation 104). The intrinsic delay of the timing path can be a sum of intrinsic delays of circuit elements along the timing path, and the timing distance of the timing path can be equal to the intrinsic delay of the timing path multiplied by a scaling factor. In some embodiments, the scaling factor can be based on a physical distance that corresponds to a unit delay. In other words, the scaling factor can correspond to the distance in the circuit design that results in a unit delay. Note that different scaling factors may be used for different technology nodes.

In general, a suitably low delay value for the circuit element can be chosen as the intrinsic delay. For example, the intrinsic delay can be the delay of the element when measured with near-zero input slew and near-zero output load. According to one definition, the intrinsic delay of a circuit element represents the delay that is "intrinsic" to the circuit element, i.e., it is the amount of delay inherent in the circuit element that is impossible or unlikely to be "optimized away."

Next, the EDA tool can compute the timing effort metric based on the physical distance and the timing distance (operation 106). Specifically, in some embodiments, the timing effort metric can be computed by dividing the physical distance by the timing distance. In general, any formula or technique can be used to generate a timing effort metric that represents the relative magnitudes of the physical distance and the timing distance. In some embodiments, a placer can use the computed timing effort metric to place the circuit design layout, e.g., the placer can place objects in the circuit design so that the timing effort metric of each timing path in a set of timing paths is less than a given threshold.

Some embodiments can display the timing effort metric in a GUI. Specifically, the embodiments can determine an attribute of a GUI element based on the computed timing effort metric, and display the GUI element with the determined attribute. Specifically, the GUI element can be a line that connects the two circuit objects, and the attribute of the GUI element can be one of: a value that is displayed in proximity to the GUI element, a color of the GUI element, or a thickness of the GUI element.

Figure 2:
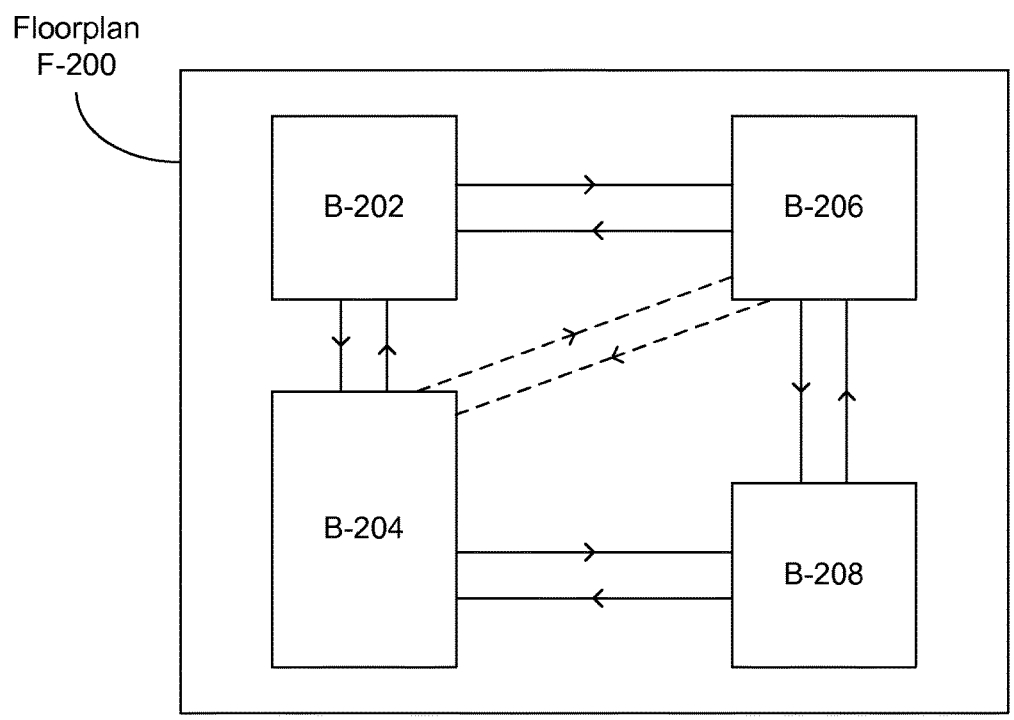
FIG. 2 illustrates how a path effort metric can be displayed in a GUI of an EDA tool in accordance with some embodiments described herein.

FIG. 2 illustrates how a path effort metric can be displayed in a GUI of an EDA tool in accordance with some embodiments described herein. A GUI of an EDA tool can display floorplan F-200 of a circuit design that includes circuit objects B-202, B-204, B-206, and B-208. Each flyline (which is a line between two objects) in FIG. 2 can correspond to one or more timing paths between the two objects. The direction of the flyline can represent the direction of the timing path (i.e., the arrow can point from the beginning object to the end object of the timing path). Information associated with a flyline can be displayed using one or more of the following flyline attributes: (1) width of the flyline (e.g., different widths can correspond to different value ranges or degrees), (2) color of the flyline (e.g., different colors can represent different value ranges or degrees), (3) text in proximity to the flyline, (4) format of the flyline (e.g., dashed, dotted, etc.), or (5) any other attribute that can be used to convey information.

For example, the flylines between circuit objects B-204 and B-206 have been shown using dashed lines to indicate that at least some timing paths between these two objects have timing effort metrics that are greater than a threshold. This visual cue can tell a user that circuit objects B-204 and B-206 need to be moved closer in the floorplan because timing paths between these two objects are very likely to violate timing requirements even after the circuit has been optimized for timing.

In some embodiments, multiple pieces of information can be simultaneously displayed using one or more attributes. For example, the color and width of the flyline can be used together to show two metrics at once. In one example, the width of the flyline can indicate the number of timing paths, and the color can indicate the maximum timing effort metric (or the median timing effort metric or any other statistic of the timing effort metrics of the timing paths).

In some embodiments, lines having different widths and different colors can be overlaid one the same flyline to show multiple metrics at once. For example, a first line having a first width and a first color can be used to represent the total number of timing paths, and a second line (that is overlaid on the first line) having a second width and a second color can be used to represent the number of timing paths whose timing effort metric is greater than a given threshold. These two lines can be overlaid on the flyline to convey both pieces of information. For example, if there are 1000 timing paths, and none of them have a timing effort metric that is greater than the threshold, then the flyline could be a thick green line. On the other hand, if half of the 1000 connections have a timing effort metric that is greater than the threshold, then the flyline could be a thick green line with a thin red line overlaid on top so that the thin red line runs longitudinally through the center of the thick green line.

Computer System

Figure 3:
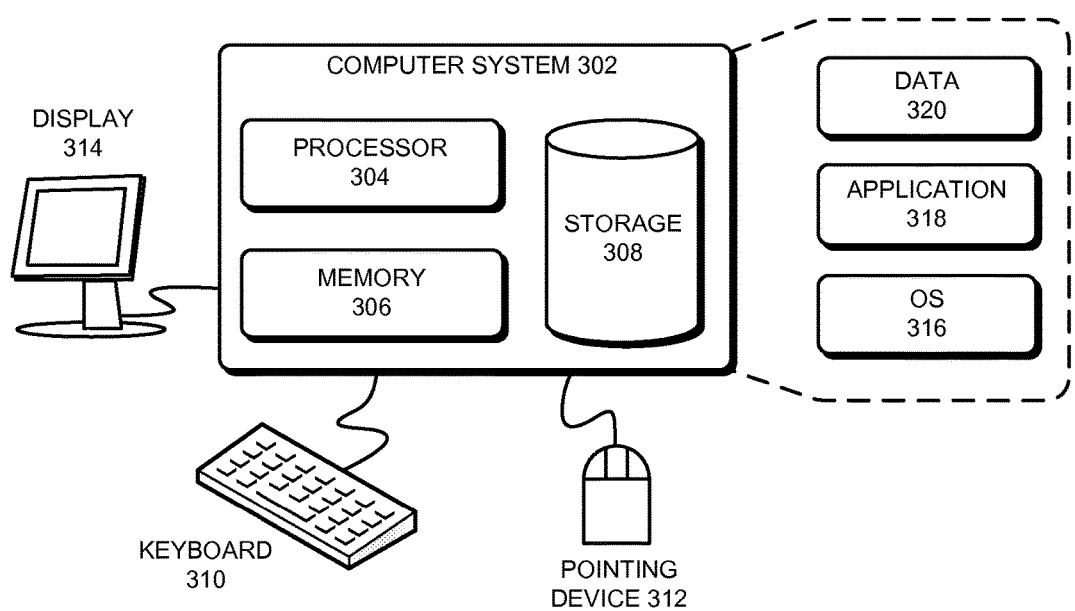
FIG. 3 illustrates a computer system in accordance with some embodiments described herein.

FIG. 3 illustrates a computer system in accordance with some embodiments described herein. Computer system 302 can include processor 304, memory 306, and storage device 308. Computer system 302 can be coupled to display device 314, keyboard 310, and pointing device 312. Storage device 308 can store operating system 316, application 318, and data 320. Data 320 can include input required by application 318 and/or output generated by application 318.

Computer system 302 may automatically (or with user intervention) perform one or more operations that are implicitly or explicitly described in this disclosure. For example, computer system 302 can load application 318 into memory 306, and application 318 can then be used to compute timing effort metrics for timing paths during one or more stages in an EDA flow.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. In an electronic design automation (EDA) tool in a computer, a method for displaying a placed circuit design in a graphical user interface (GUI) of the EDA tool, the method comprising:

the EDA tool in the computer computing an intrinsic path slack of a timing path between two circuit objects in the placed circuit design;

the EDA tool in the computer computing a physical distance between the two circuit objects in the placed circuit design;

the EDA tool in the computer computing a timing effort metric based on the intrinsic path slack and the physical distance, wherein the intrinsic path slack of the timing path between the two circuit objects does not change when the physical distance between the two circuit objects is changed in the placed circuit design; and the EDA tool in the computer displaying a GUI element associated with the timing path between the two circuit objects in the placed circuit design, wherein the displayed GUI element has a visual attribute that is based on the timing effort metric of the timing path.

2. The method of claim 1, wherein the physical distance is one of: the Cartesian distance between the two circuit objects, or the Manhattan distance between the two circuit objects.

3. The method of claim 1, wherein the GUI element is a line that connects the two circuit objects.

4. The method of claim 1, wherein the visual attribute of the GUI element is one of: a value, a color, a thickness, or a format.

5. The method of claim 1, wherein the method further comprises:

the EDA tool in the computer modifying the visual attribute of the GUI element when the physical distance between the two circuit objects is modified.

6. The method of claim 5, wherein the visual attribute of the GUI element is modified continuously as the physical distance between the two circuit objects is modified in the GUI.

7. A non-transitory computer-readable storage medium storing instructions of an electronic design automation (EDA) tool that, when executed by a computer, cause the computer to perform a method for displaying a placed circuit design in a graphical user interface (GUI) of the EDA tool, the method comprising:

computing an intrinsic path slack of the timing path between the two circuit objects in the placed circuit design;

computing a physical distance between the two circuit objects in the placed circuit design;

computing a timing effort metric based on an intrinsic path slack and the physical distance, wherein the intrinsic path slack of the timing path between the two circuit objects does not change when the physical distance between the two circuit objects is changed in the placed circuit design; and displaying a GUI element associated with the timing path between the two circuit objects in the placed circuit design, wherein the displayed GUI element has a visual attribute that is based on the timing effort metric of the timing path.

8. The non-transitory computer-readable storage medium of claim 7, wherein the physical distance is one of: the Cartesian distance between the two circuit objects, or the Manhattan distance between the two circuit objects.

9. The non-transitory computer-readable storage medium of claim 7, wherein the GUI element is a line that connects the two circuit objects.

10. The non-transitory computer-readable storage medium of claim 7, wherein the visual attribute of the GUI element is one of: a value, a color, a thickness, or a format.

11. The non-transitory computer-readable storage medium of claim 7, wherein the method further comprises:
modifying the visual attribute of the GUI element when the physical distance between the two circuit objects is modified.

12. The non-transitory computer-readable storage medium of claim 11, wherein the visual attribute of the GUI element is modified continuously as the physical distance between the two circuit objects is modified in the GUI.

13. An apparatus, comprising:
a processor; and
a non-transitory computer-readable storage medium storing instructions of an electronic design automation (EDA) tool that, when executed by the processor, cause the apparatus to perform a method for displaying a placed circuit design in a graphical user interface (GUI) of the EDA tool, the method comprising:
computing an intrinsic path slack of a timing path between the two circuit objects in the placed circuit design;
computing a physical distance between the two circuit objects in the placed circuit design;
computing a timing effort metric based on the intrinsic path slack and the physical distance, wherein the intrinsic path slack of the timing path between the two circuit objects does not change when the physical distance between the two circuit objects is changed in the placed circuit design; and
displaying a GUI element associated with the timing path between the two circuit objects in the placed circuit design, wherein the displayed GUI element has a visual attribute that is based on the timing effort metric of the timing path.

14. The EDA system of claim 13, wherein the physical distance is one of: the Cartesian distance between the two circuit objects, or the Manhattan distance between the two circuit objects.

15. The EDA system of claim 13, wherein the GUI element is a line that connects the two circuit objects.

16. The EDA system of claim 13, wherein the visual attribute of the GUI element is one of: a value, a color, a thickness, or a format.

17. The EDA system of claim 13, wherein the method further comprises:
continuously modifying the visual attribute of the GUI element as the physical distance between the two circuit objects is modified in the GUI.

* * * * *